Oct. 30, 1934. A. E. ULFENG ET AL 1,978,849
PORTABLE NONDEFRAUDABLE CASH RECORDER
Filed Nov. 1, 1932 3 Sheets-Sheet 1
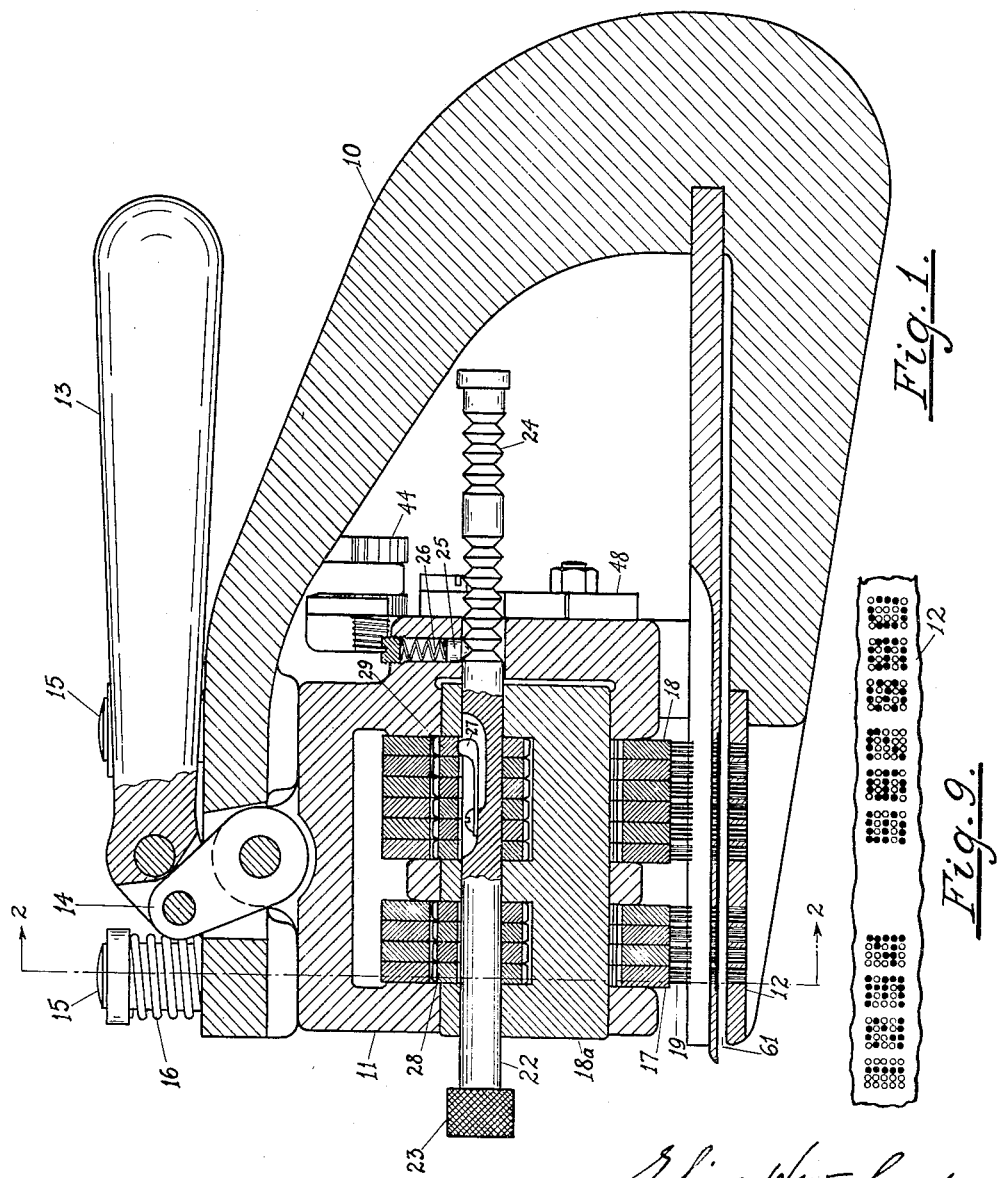

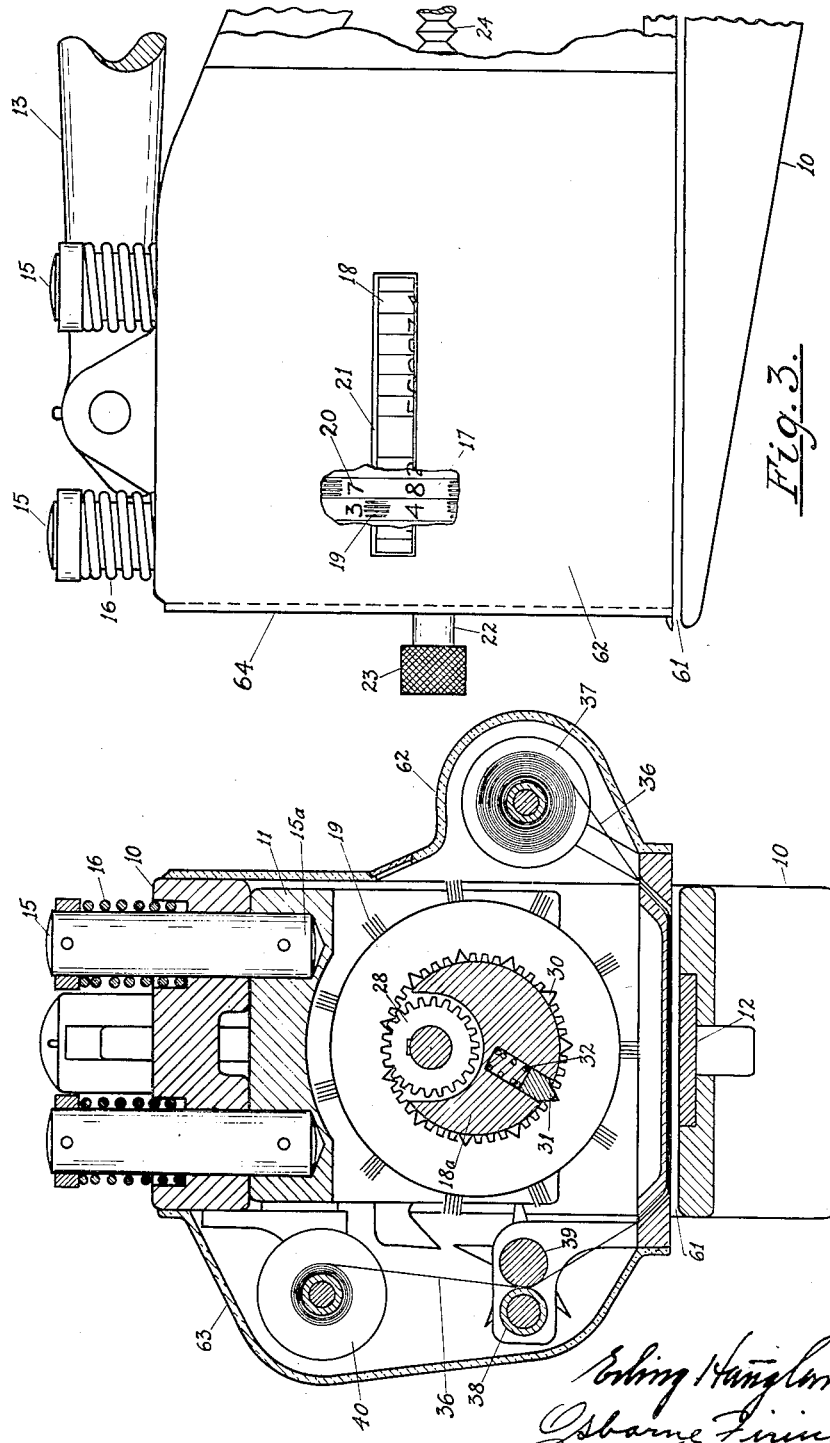

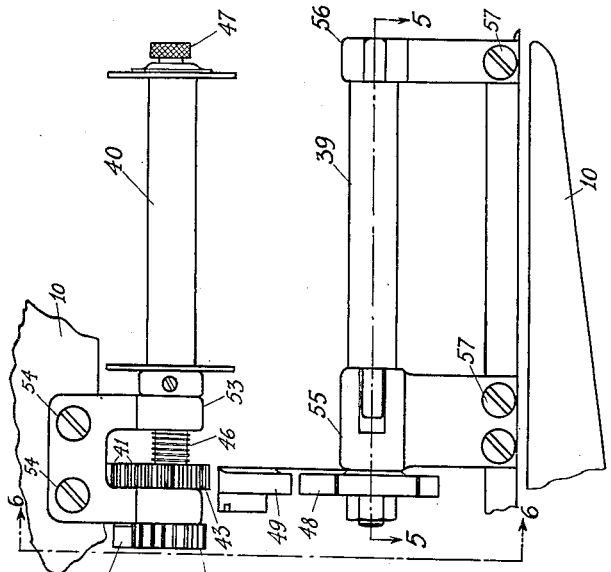
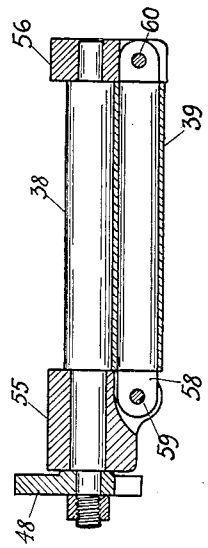
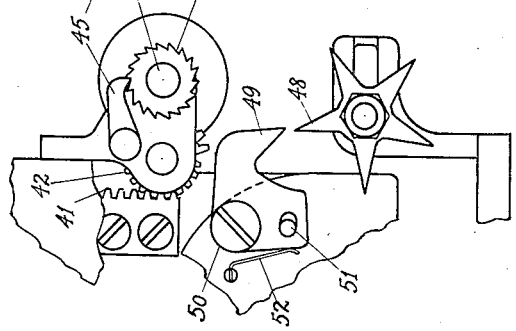
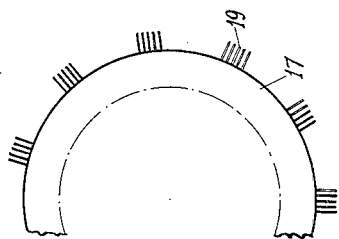

Patented Oct. 30, 1934

1,978,849

UNITED STATES PATENT OFFICE 1,978,849

PORTABLE NONDEFRAUDABLE CASH RECORDER

Asbjorn E. Ulfeng and Erling Haugland, Brooklyn, and Osborne Firing, New Dorp, N. Y.

Application November 1, 1932, Serial No. 640,594

10 Claims. (Cl. 164—120)

Our invention relates to improvements in method and apparatus for the checking, receipting and accounting of the cash amounts received by travelling collectors, salesmen, etc. Heretofore it has been the practice to let, for instance, collectors for insurance companies receive the moneys due and pay said moneys to the office only at certain intervals. In this way it is necessary that the collector keeps considerable money on hand over periods of time when he may become tempted to use some of it for himself. When accounting for his transactions, therefore, he often falsifies his records, and these being difficult to check back, considerable amounts may be embezzled. The objects of our invention are therefore: first—to provide a light, portable register which will prevent frauds; second—to provide a light, portable cash register which will punch records and receipts with non-erasable numbers and furnish an undisputable record which may easily be checked; third—to provide a light, portable cash register which will also do the agent's bookkeeping.

We attain these objects by the mechanism illustrated in the accompanying drawings, in which—

Fig. 1 is a vertical, longitudinal section of the entire machine; Fig. 2, a vertical transversal section along the line 2—2 in Fig. 1; Fig. 3, a partial elevation of the right hand side of the machine; Fig. 4, a partial elevation of the left hand side of the machine; Fig. 5, a section on line 5—5 in Fig. 4; Fig. 6, a section on line 6—6 in Fig. 4; Fig. 7, a plan view of a number wheel; Fig. 8, a side view of a number wheel; Fig. 9, an enlarged plan view of the number dies; and Fig. 10 is a view of the special gear driving the record roll.

Similar numerals refer to similar parts throughout the several views.

The machine consists principally of a heavy U-shaped supporting yoke 10, an adjustable punching head 11 and the dies 12. The punching head 11 is movable up and down with the handle 13 through link 14 while it is supported by four guide pins 15 which slide in holes in the yoke 10 and are pinned to the punching head 11 by pins 15a. The punching head 11 is pulled back in its upward position by springs 16. In the preferred arrangement as shown in Fig. 1 the punching head 11 is supplied with six number wheels 18 for punching amounts and four wheels 17 for punching the date. All these wheels are rotatable on a large diameter shaft 18a, and each one carries ten sets of punches 19 for punching the numbers 1, 2, 3, 4, 5, 6, 7, 8, 9, 0, blank, while between each set of punches there is placed an easily readable number designated by reference character 20 so displaced on the periphery of the wheels (17 or 18) that it is visible through the window 21 (Fig. 3) when the punch for the corresponding number is located directly above the dies 12.

The number wheels 17 and 18 may be adjusted to the desired position by the shaft 22 terminated in a knob 23 and axially adjustable at will into any one of the ten positions determined by the annular grooves 24; in which several positions, the shaft 22 is held fixed as far as axial motion is concerned by the plunger-stopper 25 backed up by spring 26 while it is free to rotate around its axis. On shaft 22 is fastened the spring key 27 which will successively engage the spur gears 28 and 29 which are in mesh with corresponding internal gears on the wheels 17 and 18, which thus individually may be set to any desired position. The gears 28 and 29 are rotatable on shaft 22 when not engaged by the spring key 27 and the shaft 22 is journaled in the large diameter shaft 18a, in which is also cut annular semi-cylindrical slots to house the gears 28 and 29.

In the inside periphery of wheels 17 and 18 are cut slots 30 (Fig. 2) into which the stoppers 31 backed by springs 32 will slip when the wheels are in operating location. Due to the fact that gears 28 are in mesh with internal teeth on the wheels 17 and 18 so many teeth are in mesh at one time that slots 30 do not affect the working of the gears.

In Fig. 2 is further shown how the recording paper 36, which may also if desired be a thin film of metal, leaves the supply roll 37 and travels under the punching head 11 between the number wheels 17, 18 and directly over the dies 12; from there it goes between the rolls 38 and 39 (Figs. 4 and 5); and finally is wound up on the record roll 40. A toothed rack, Fig. 5 and Fig. 6, rigidly connected to the punching head 11, is in mesh with gear 42 on one side of same while the other side of this gear (42) is in mesh with gear 43 driving the record roll 40 ahead every time the punching head 11 is brought down. Fig. 10 shows in detail the construction of the gear 42 which has a smaller pitch diameter on the side next to the rack, so that a comparatively small movement of the punching head 11 will result in a large movement of the roll 40.

Figures 4, 5 and 6 show further how the roll 40 is supplied with a pawl wheel 44 and pawl 45 for holding the paper taut while the spring 46 in known way acts as a pawl for gear 43 so that the punching head 11 may be brought back in its upward position without unwinding the record 36. The roll 40 is removable by unscrewing the knurled screw 47 as is the supply roll 37 when a new supply of paper must be put on. Further is shown in Figs. 4, 5 and 6 how the rolls 38 and 39 clamp the paper 36; and by the action of the five-starred wheel 48, which is blocked by the movable cam 49 every time the punching head 11 is brought down, it is permitted that the record progress only in definite and unvarying amounts for each stroke regardless of the diameter of the roll 40. The cam 49 is secured to the punching head 11 by the screw 50 about which it is also rotatable in a small angle determined by the stop 51 and spring 52. The shaft carrying roll 40 is journalled in double bearings 53 which again are secured to yoke 10 by screw 54. In a similar way is roll 38 supported in bearings 55 and 56 which again are supported on yoke 10 by screws 57. The roll 39 is supported on a shaft 58 both ends of which are slotted to form a latch and secured, respectively, by pins 59 and 60.

In Fig. 7 and Fig. 8 is shown in detail the construction of one of the number wheels 17 and 18, the periphery of which carries the needle punches 19 alternating with visible numbers 20. These needle punches 19 are worked out from a matrix of, preferably, four by five holes as shown in Fig. 9, so that with a minimum number of needles and positions of same any number may be legibly punched.

A deep slot 61 is arranged by the insertion of the agents' book as well as the customers' receipts to be punched. Both sides of the machine are closed up with covers 62 and 63 which may be locked securely in place to prevent unauthorized tampering with the records.

The operation of our invention is as follows: The date is set by adjusting the shaft 22 to engage the necessary wheels 17. When a record of a cash transaction is to be made the amount is set on the wheels 18 by pulling the shaft 22 into operating position of the respective wheels and setting the numbers by looking through window 21. The agent's book as well as the customer's receipt is then inserted in slot 61 and the handle 13 is pulled up in a vertical position. This brings the punching head 11 down toward the dies, whereby the punches 19 first perforate the recording paper 36, and finally the receipt and page of the book to be punched. As the handle 13 is brought back in its original position the springs 16 pull the head 11 up. During the first part of the downward stroke the rack 41 through gears 42 and 43 operates the roll 40 and thus advances the record 36 until the cam 49 blocks the wheel 48. The paper is now being held by friction between the rolls 38 and 39, and is prevented from advancing further by the star wheel 48. Every stroke, therefore, gives a net advance of one fifth the circumference of the roll 38. In the upward movement of the head 11 the spring 46 connecting gear 43 to the shaft 40a slides freely and the roll 40 is held back by pawl wheel 44 and pawl 45. The chief purpose of the present arrangement is to effectively prevent any advance with consequent tearing of the record while the punches are entering or leaving the dies.

After a given period of use the machine is brought back to its home office for accounting purposes. The front cover 64 is then unlocked and the record roll 40 removed for checking the record against the figures in the agent's book. An unchangeable, undisputable record is thus immediately available and knowing this the agent would never dare to attempt any falsifications. A fresh roll of paper is then put in (37) and the machine is again ready for further use.

Having thus described our invention, what we claim is:

1. A portable, non-defraudable cash register of the character set forth comprising a supporting yoke, an adjustable punching head slidably connected to the yoke, said punching head comprising a plurality of number wheels having punches alternating with visible numbers on the periphery of the wheels, a support and dies for the book and receipts to be punched, means for manually operating said punching mechanism together with automatic means for bringing the punching head back in its upward position, means for adjusting said punching mechanism through the use of a sliding shaft engaging in turn any one of a number of internal gears which are constantly in mesh with the several number wheels.

2. A portable, non-defraudable cash register of the character set forth comprising a supporting yoke, an adjustable punching head slidably connected to the yoke, a support and dies for the record, book and receipt to be punched, means for setting and operating said punching mechanism and recording means for keeping under lock and key an unchangeable, undisputable record of all transactions made, means for automatically advancing said record a definite, unvarying amount for each stroke regardless of the diameter of the record roll.

3. A portable, non-defraudable cash register of the character set forth comprising a supporting yoke, an adjustable punching head slidably connected to the yoke, a support and dies for the record, book and receipt to be punched, means for setting and operating said punching mechanism and recording means for keeping under lock and key an unchangeable, undisputable record of all transactions made, means for automatically advancing said record a definite, unvarying amount for each stroke regardless of the diameter of the record roll and means for preventing any motion of said recording mechanism while the punches are entering and leaving the lower extremity of the stroke.

4. In a portable, non-defraudable cash recorder of the character described, the combination of a support, an enclosed and locked recording mechanism, a punching mechanism consisting of a number of disks carrying on their several peripheries needle matrices of the characters to be punched, said disks being rotatably mounted on an eccentrically hollow main shaft, the semi-cylindrical eccentric groove in this shaft being open on one side.

5. In a portable, non-defraudable cash recorder of the character described, the combination of a support, an enclosed and locked recording mechanism, a punching mechanism consisting of a number of disks carrying on their several peripheries needle matrices of the characters to be punched, between each punching matrix a raised, easily readable, number angularly displaced so as to be observable through a convenient window, said disks being rotatably mounted on an eccentrically hollow main shaft, the semi-cylindrical eccentric groove in this shaft being open on one side.

6. In a portable, non-defraudable cash recorder of the character described, the combination of a support, an enclosed and locked recording mechanism, a punching mechanism consisting of a number of disks carrying on their several peripheries needle matrices of the characters to be punched, between each punching matrix a raised, easily readable, corresponding character, angularly displaced so as to be observable through a convenient window, said disks being rotatably mounted on an eccentrically hollow main shaft, the semi-cylindrical eccentric groove in this shaft being open on one side, said semi-cylindrical eccentric groove containing a number of spur gear pinions engaging internal gears cut in the several punching disks, these pinions being rotatably mounted on a slidably journaled concentric shaft having a spring key which may be slidably engaged to any one of the pinions.

7. In a portable, non-defraudable cash recorder of the character described, the combination of a support, an enclosed and locked recording mechanism, a punching mechanism consisting of a number of disks carrying on their several peripheries needle matrices of the characters to be punched, between each punching matrix a raised, easily readable, corresponding character, angularly displaced so as to be observable through a convenient window, said disks, being rotatably mounted on an eccentrically hollow main shaft, the semi-cylindrical eccentric groove in this shaft being open on one side, said semi-cylindrical eccentric groove containing a number of spur gear pinions engaging internal gears cut in the several punching disks, these pinions being rotatably mounted on a slidably journaled concentric shaft having a spring key which may be in turn slidably engaged to any one of the pinions, said eccentrically hollow main shaft having on one side a number of staggered holes containing spring-backed pawls engaging suitable slots in the inside periphery of the punching disks.

8. In a portable, non-defraudable cash recorder of the character described, the combination of a support, an enclosed and locked recording mechanism, a punching mechanism consisting chiefly of a number of disks carrying on their several peripheries needle matrices of the characters to be punched, between each punching matrix a raised easily readable, corresponding character, angularly displaced so as to be observable through a convenient window, said disks being rotatably mounted on an eccentrically hollow main shaft, the semi-cylindrical eccentric groove in this shaft being open on one side, said semi-cylindrical eccentric groove containing a number of spur gear pinions engaging internal gears cut in the several punching disks, these pinions being rotatably mounted on a slidably journaled concentric shaft having a spring key which may be in turn slidably engaged to any one of the pinions, said slidably journaled concentric shaft having at one end a knob for turning and at the other end a number of annular grooves corresponding to the number and thickness of the punching disks, a spring-backed pawl engaged in said grooves in a way so as to prevent axial motion but at the same time permitting rotation.

9. In a portable cash recorder the combination of a supporting yoke, an adjustable punching head slidably connected to the yoke, a support and dies for the book and receipt to be perforated, means for setting and operating said punching mechanism, recording means for keeping perforated unchangeable records of all transactions made, said recording mechanism comprising a rack operated, ratchet protected record advancing roll, a cam operated star wheel, tension rolls controlled by said star wheel, said cam being mounted on the slidable punching head in a position so as to block the rotation of the star wheel during the last part of the downward stroke whereby the advancing of the record is prevented during the perforating operation.

10. In a portable cash recorder the combination of a supporting yoke, an adjustable punching head slidably connected to the yoke, a support and dies for the book and receipt to be perforated, means for setting and operating said punching head, recording means for keeping perforated unchangeable records of all transactions made, said recording mechanism comprising a rack operated, ratchet protected record advancing roll, a special variable pitch gear engaging on one side said rack being operated by the downward motion of the punching head, on the other side said gear with a smaller radius engaging a gear which through spring coupling means drives said record advancing roll, a cam operated star wheel, tension rolls controlled by said star wheel, said cam being mounted on the slidable punching head in a position so as to block the rotation of the star wheel during the last part of the downward stroke whereby the advancing of the record is prevented during the perforating operation.

ERLING HAUGLAND.
OSBORNE FIRING.
ASBJORN E. ULFENG.